United States Patent
Yamaguchi et al.

(10) Patent No.: US 6,810,181 B2
(45) Date of Patent: Oct. 26, 2004

(54) ELECTRODE STRUCTURE

(75) Inventors: Masatoshi Yamaguchi, Tsukuba (JP); Nobuo Miyadera, Tsukuba (JP); Kiyoshi Yamanoi, Tsukuba (JP); Hiroyuki Matsuura, Tsukuba (JP)

(73) Assignee: Hitachi Chemical Co., Ltd., Tokyo (JP)

(*) Notice: Subject to any disclaimer, the term of this patent is extended or adjusted under 35 U.S.C. 154(b) by 0 days.

(21) Appl. No.: 10/714,911

(22) Filed: Nov. 18, 2003

(65) Prior Publication Data

US 2004/0096161 A1 May 20, 2004

Related U.S. Application Data

(63) Continuation of application No. PCT/JP02/05194, filed on May 29, 2002.

(30) Foreign Application Priority Data

May 29, 2001 (JP) ........................................ 2001-160681

(51) Int. Cl.[7] ................................................ G02B 6/10
(52) U.S. Cl. ........................... 385/40; 385/147; 428/621
(58) Field of Search ........................... 385/40, 41, 147; 428/615, 621–626

(56) References Cited

U.S. PATENT DOCUMENTS 6,054,971 A * 4/2000 Okada et al. .................. 345/89

FOREIGN PATENT DOCUMENTS

| JP | 10-333191 | 12/1998 |
|---|---|---|
| WO | WO98/37445 | 8/1998 |

* cited by examiner

Primary Examiner—John D. Lee
(74) Attorney, Agent, or Firm—Westerman, Hattori, Daniels & Adrian, LLP

(57) ABSTRACT

The present invention relates to an electrode structure, which comprises a substrate provided with an electrode formed thereon, wherein the substrate comprises a layer of a fluorine-containing polyimide and a layer of a fluorine-free resin is interposed between the polyimide layer and the electrode and, in particular, to the foregoing electrode structure, wherein the electrode comprises a gold layer as the outermost or surface layer and an aluminum layer interposed between the substrate and the gold layer. The electrode structure of the present invention never causes any peeling off of the electrode due to insufficient adhesion of the electrode to the substrate, the structure has sufficiently high strength and therefore the boundary between the substrate and the electrode formed thereon is not destroyed by the energy of ultrasonics applied thereto.

11 Claims, 4 Drawing Sheets

(a)

(b)

(c)

ELECTRODE STRUCTURE

This application is a continuation of international application No. PCT/JP02/05194, filed on May 29, 2002.

TECHNICAL FIELD

The present invention relates to a substrate and an electrode structure and more specifically to an electrode structure of a substrate for an optical waveguide device to which electronic parts or the like are attached.

BACKGROUND ART

As the recent wide spread of personal computers and internet communication, the demand for the transmission of information has rapidly been increased. For this reason, there has been desired for the spread of the optical transmission means whose transmission speed is quite high even to the terminal information processing devices such as personal computers. It is thus necessary that a high quality optical waveguide for the optical interconnection should be produced in a large scale at a low price.

As materials for forming optical waveguides, there have been known inorganic materials such as glass and semiconductor materials and resins. An optical waveguide of an inorganic material is in general produced according to a method, which comprises the steps of forming a film of an inorganic material using a film-forming system such as a vacuum vapor deposition system or a sputtering device and then etching the inorganic film thus formed into an optical waveguide having a desired shape. However, the vacuum vapor deposition system or the sputtering device requires the use of an evacuation system and therefore, a large-sized and expensive apparatus should be used. Moreover, this method requires the use of an evacuation step and this makes the process more complicated. On the other hand, when preparing an optical waveguide using a resin, the film-forming process or coating and heating steps can be conducted under the atmospheric pressure and therefore, the method, which makes use of a resin, is advantageous in that quite simple system and process can be used.

Although, there have been known various kinds of resins, which can be used for forming core and clad layers of an optical waveguide, those particularly expected are polyimides each having a high glass transition point (Tg) and excellent in the heat resistance among others. When forming the core and clad layers of an optical waveguide from a polyimide, the resulting optical waveguide is expected to have long-term reliability and an ability of withstanding soldering. Among these polyimides, fluorine-containing polyimides have in general been used because of their excellent characteristic properties concerning refractive indices.

The optical waveguide device should electrically be connected to an optical part such as a laser diode or a photodiode or an electronic part. As a means for realizing such an electrical connection, the wire-bonding technique has in general been used, in which the foregoing elements are connected through a gold wire bonded thereto by the application of ultrasonics. As an electrode for the wire bonding connection, there has conventionally been used, for instance, an electrode lead-out portion as shown in FIG. 6, which is obtained by forming a platinum (Pt) layer 16 on a titanium (Ti) layer 15 and then forming a gold (Au) layer 14 as the upper most layer. Alternatively, an electrode lead-out portion as shown in FIG. 7 has also been used, which is obtained by forming a chromium (Cr) layer 13 and then forming a gold (Au) layer 14 as the upper most layer.

DISCLOSURE OF THE INVENTION

In this connection, when forming a deposited (or laminate) film of, for instance, Ti, Pt or Au as an electrode and/or a deposited film of, for instance, Cr or Au on the optical waveguide prepared using a fluorine-containing polyimide, however, a problem arises such that the electrode film is peeled off from the optical waveguide during the formation of an electrode pattern since the adhesion of the fluorine-containing polyimide to the electrode is quite low.

Moreover, when processing a metal such as Ti, Pt or Au into a desired pattern in case of a deposited film of such a metal, a problem arises such that it is difficult to etch the metal film according to the wet etching technique using an etching liquid since the metals such as Ti, Pt and Au have high resistance to chemicals and that the resulting pattern is inaccurate. For this reason, such a pattern is formed by a method such as the reactive dry etching using chlorine-containing gases or the ion milling technique, but these techniques require a high cost of equipment and they require the use of large-scale equipments in order to ensure safety. Under such circumstances, there has been used an electrode lead-out portion as shown in FIG. 7, which is obtained by forming a chromium (Cr) layer 13 on a silicon substrate and then forming a gold (Au) layer 14 as the upper most layer. These metals may easily be etched by the wet etching technique using an etching liquid and the resulting pattern is excellent in accuracy. However, a problem arises, that is, when the electrode lead-out portion is subjected to wire bonding, the boundary between the Cr layer and the substrate is destroyed by the energy of the ultrasonics applied thereto for the wire bonding and it has thus been impossible to ensure sufficient strength in the foregoing electrical connection.

Accordingly, it is an object of the present invention to provide an electrode in which the foregoing conventional problem never arises such that the electrode is peeled off from a substrate or a polymer optical waveguide device due to the insufficient adhesion between the electrode and the substrate or the device and which is excellent in the accuracy of the resulting electrode pattern. In addition, it is another object of the present invention to provide an electrode structure, which can ensure sufficient strength at the boundary between a substrate and an electrode formed thereon to thus prevent any breakage of the boundary by the energy of ultrasonics applied thereto for wire bonding.

According to the present invention, there are thus provided electrode structures detailed below:

[1] An electrode structure, which comprises a substrate provided with an electrode formed thereon, wherein the substrate comprises a layer of a fluorine-containing polyimide and a layer of a fluorine-free resin is interposed between the polyimide layer and the electrode. The interposition of the fluorine-free resin layer permits the improvement of the adhesion between the fluorine-containing polyimide layer and the electrode.

[2] The electrode structure as set forth in the foregoing item [1], wherein the fluorine-free resin is fluorine-free polyimide. The interposition of the fluorine-free polyimide layer permits the further improvement of the adhesion between the fluorine-containing polyimide layer and the electrode.

[3] The electrode structure as set forth in the foregoing item [1] or [2], wherein the substrate is a silicon wafer on which a fluorine-containing polyimide resin layer and a fluorine-free resin layer are laminated in this order.

[4] The electrode structure as set forth in any one of the foregoing items [1] to [3], wherein the substrate is a silicon wafer on which a silicon oxide film, a fluorine-containing polyimide resin layer and a fluorine-free resin layer are laminated in this order.

[5] The electrode structure as set forth in any one of the foregoing items [1] to [4], wherein the substrate is an optical waveguide substrate.

[6] The electrode structure as set forth in any one of the foregoing items [1] to [5], wherein the electrode comprises a gold layer as the outermost or surface layer and an aluminum layer interposed between the substrate and the gold layer.

[7] The electrode structure as set forth in the foregoing item [6], wherein the electrode comprises a gold layer as the outermost or surface layer, an aluminum layer interposed between the substrate and the gold layer and further a layer of a high melting point material arranged between the gold and aluminum layers.

[8] The electrode structure as set forth in the foregoing item [7], wherein the high melting point material comprises a material selected from the group consisting of chromium, titanium, molybdenum, tungsten and mixtures each containing at least two of these materials.

[9] The electrode structure as set forth in the foregoing item [7], wherein the high melting point material is a ceramic.

[10] The electrode structure as set forth in the foregoing item [7], wherein the high melting point material comprises a material selected from the group consisting of silicon monoxide, silicon dioxide, titanium monoxide, titanium dioxide, titanium sesquioxide, silicon carbide, silicon nitride, chromium oxide, tantalum penta-oxide and mixtures each containing at least two of these materials.

[11] The electrode structure as set forth in any one of the foregoing items [6] to [10], wherein the overall thickness of the electrode including the gold and aluminum layers is not more than 4 μm.

EXPLANATION OF THE REFERENCE NUMERALS

Figure 1:
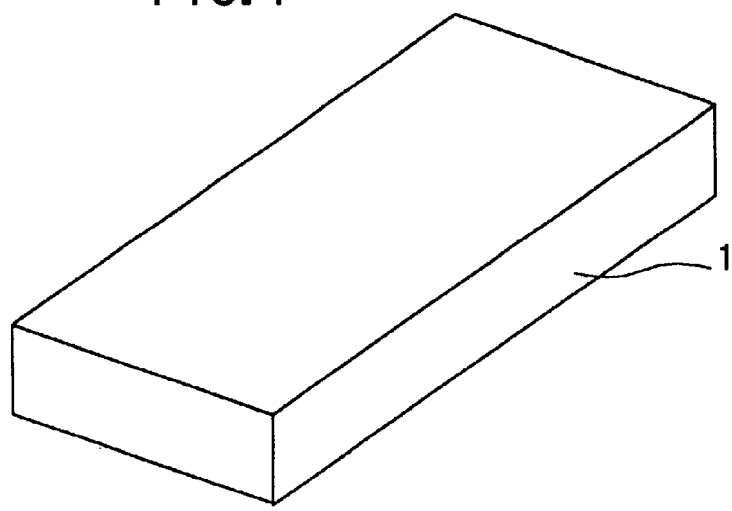
FIGS. 1(a)–1(c) constitute a flow diagram showing partially broken perspective views for illustrating a method for the production of a schematic optical waveguide device according to an embodiment of the present invention.
Figure 1:
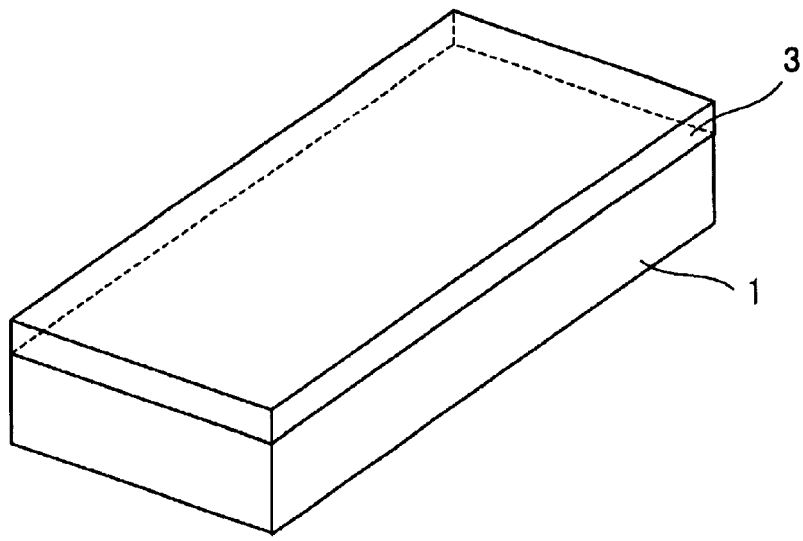
Figure 1:
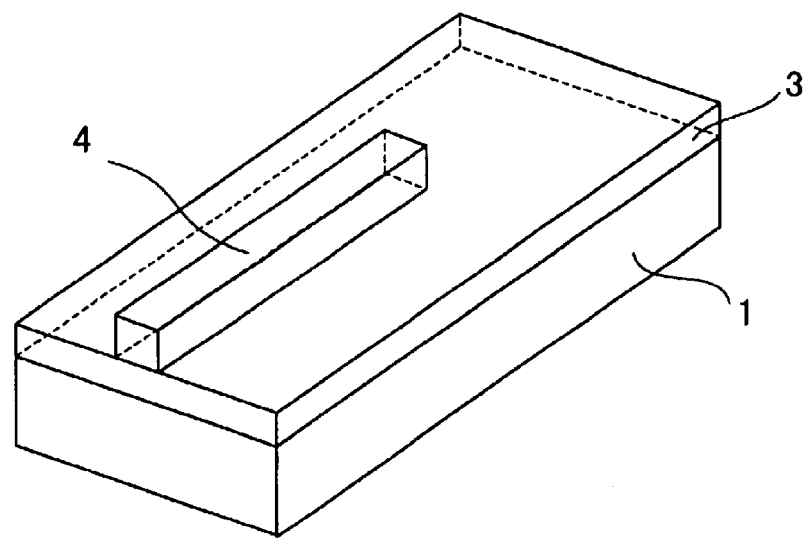

1 . . . Silicon substrate; 3 . . . Lower clad layer; 4 . . . Optical waveguide; 5 . . . Upper clad layer; 6 . . . Adhesive layer; 7 . . . Electrode; 10 . . . Optical waveguide laminate; 13 . . . Chromium layer; 14 . . . Gold layer; 15 . . . Titanium layer; 16 . . . Platinum layer; 61 . . . Substrate; 62 . . . Resist layer; 63 . . . Vapor-deposited laminate film; 100 . . . Optical waveguide device.

BEST MODE FOR CARRYING OUT THE INVENTION

The present invention relates to an electrode structure, which comprises a substrate provided with an electrode formed thereon and the present invention is characterized in that the substrate comprises a layer of a fluorine-containing polyimide and a layer of a fluorine-free resin interposed between the polyimide layer and the electrode.

Examples of such fluorine-free resins used in the present invention are a variety of resins such as polyimide resins, silicone resins, acrylic resins, polycarbonate resins, epoxy resins, polyamide resins, polyester resins and phenolic resins. In the applications wherein heat resistance is required depending on, for instance, steps for the production of elements or the use environment, preferably used are, for instance, polyimide resins and polyquinoline resins. As such fluorine-free resins, particularly preferred are nitrogen-containing resins.

Examples of fluorine-free polyimides used in the present invention are polyimide resins, poly(imide-isoindoloquinazolin-dione-imide) resins, poly(ether-imide) resins, poly(amide-imide) resins and poly(ester-imide) resins. As the fluorine-free resins used in the present invention, it is possible to select resins whose fluorine content is considerably lower than those observed for the fluorine-containing polyimide resins instead of fluorine-free resins. More specifically, the fluorine content thereof is preferably not more than 10% by mass. More preferably, the fluorine content thereof is not more than 2% by mass.

Examples of fluorine-containing polyimide resins used in the present invention include fluorine-containing polyimide resins, fluorine-containing poly(imide-isoindoloquinazolin-dione-imide) resins, fluorine-containing poly(ether-imide) resins and fluorine-containing poly(amide-imide) resins. In the preparation of a poly(amide-imide) resin, anhydrous trimellitic acid chloride is, for instance, used. A solution of a precursor used for preparing polyimide resins can be obtained by the reaction of a tetracarboxylic acid di-anhydride with a diamine in a polar solvent such as N-methyl-2-pyrrolidone, N,N-dimethylacetamide, γ-butyrolactone or dimethyl-sulfoxide. Moreover, a solution of a precursor used for preparing fluorine-containing polyimide resins can be obtained by the reaction of a fluorine-containing tetracarboxylic acid di-anhydride with a diamine. Alternatively, a solution of a precursor used for preparing fluorine-containing polyimide resins can be obtained by the reaction of a tetracarboxylic acid di-anhydride with a fluorine-containing diamine. In case where the both tetracarboxylic acid di-anhydride and diamine are fluorine-free, a solution of a precursor used for preparing fluorine-free polyimide resins can be obtained.

Specific examples of fluorine-free tetracarboxylic acid di-anhydrides include pyromellitic acid di-anhydride, benzene-1,2,3,4-tetracarboxylic acid di-anhydride, 3,3',4,4'-diphenyl-tetracarboxylic acid di-anhydride, 2,2',3,3'-diphenyl-tetracarboxylic acid di-anhydride, 2,3,3',4'-diphenyl-tetracarboxylic acid di-anhydride, p-terphenyl-3,4,3'',4''-tetracarboxylic acid di-anhydride, m-terphenyl-3,4,3'',4''-tetra-carboxylic acid di-anhydride, 1,2,5,6-naphthalene-tetracarboxylic acid di-anhydride, 2,3,6,7-naphthalenetetracarboxylic acid di-anhydride, 1,2,4,5-naphthalene-tetra-carboxylic acid di-anhydride, 1,4,5,8-naphthalene-tetracarboxylic acid di-anhydride, 2,6-dichloro-naphthalene-1,4,5,8-tetracarboxylic acid di-anhydride, 2,7-dichloro-naphthalene-1,4,5,8-tetracarboxylic acid di-anhydride, 2,3,6,7-tetrachloro-naphthalene-1,4,5,8-tetracarboxylic acid di-anhydride, 2,3,5,6-pyridine-tetracarboxylic acid di-anhydride, 3,4,9,10-perylene-tetracarboxylic acid di-anhydride, 3,3',4,4"-benzophenone-tetracarboxylic acid di-anhydride, 2,2',3,3'-benzophenone-tetracarboxylic acid di-anhydride, 2,3,3',4'-benzophenone-tetracarboxylic acid di-anhydride, 3,3',4,4'-biphenyl ether-tetracarboxylic acid di-anhydride, 4,4'-sulfonyl-diphthalic acid di-anhydride, 3,3',4,4'-tetraphenylsilane-tetracarboxylic acid di-anhydride, 3,3',4,4'-diphenyl ether tetracarboxylic acid di-anhydride, 1,3-bis(3,4-dicarboxyphenyl)-1,1,3,3-tetramethyl-di-siloxane di-anhydride, 1-(2,3-dicarboxyphenyl)-3-(3,4-dicarboxyphenyl)-1,1,3,3-tetra-methyl-disiloxane di-di-anhydride, 2,2-bis(3,4-dicarboxyphenyl)propane di-anhydride, 2,2-bis(2,3-dicarboxyphenyl)propane di-anhydride, 1,1-bis(2,3-dicarboxyphenyl)ethane di-anhydride, 1,1-bis(3,4-dicarboxyphenyl)ethane di-anhydride, bis(2,3-dicarboxyphenyl)methane di-anhydride, bis(3,4-dicarboxyphenyl)methane di-anhydride, bis(3,4-di-carboxyphenyl)sulfone di-anhydride, phenanthrene-1,8,9,10-tetracarboxylic acid di-anhydride, pyrazine-2,3,5,6-tetracarboxylic acid di-anhydride, thiophene-2,3,4,5-tetracarboxylic acid di-anhydride, bis(3,4-dicarboxyphenyl)dimethyl-silane di-anhydride, bis(3,4-dicarboxyphenyl)methylphenyl-silane di-anhydride, bis(3,4-dicarboxy-phenyl) di-phenyl-silane di-anhydride, 1,4-bis(3,4-dicarboxyphenyl-dimethyl-silyl) benzene di-anhydride, 1,3-bis(3,4-dicarboxyphenyl)-1,1,3,3-tetramethyl-dicyclohexane di-anhydride, p-phenyl-bis(trimellitic acid monoester anhydride), ethylene glycol-bis(trimellitic acid anhydride), propane-diol-bis(trimellitic acid anhydride), butane-diol-bis(trimellitic acid anhydride), pentane-diol-bis(trimellitic acid anhydride), hexane-diol-bis(trimellitic acid anhydride), octane-diol-bis(trimellitic acid anhydride), decane-diol-bis(trimellitic acid anhydride), ethylene tetracarboxylic acid di-anhydride, 1,2,3,4-tetracarboxylic acid di-anhydride, decahydronaphthalene-1,4,5,8-tetra-carboxylic acid di-anhydride, 4,8-dimethyl-1,2,3,5,6,7-hexahydronaphthalene-1,2,5,6-tetracarboxylic acid di-anhydride, cyclopentane-1,2,3,4-tetracarboxylic acid di-anhydride, pyrrolidine-2,3,4,5-tetracarboxylic acid di-anhydride, 1,2,3,4-cyclobutane-tetracarboxylic acid di-anhydride, bis(exo-bicyclo[2,2,1]heptane-2,3-dicrboxylic acid anhydride)sulfone, bicyclo-(2,2,2)-octo-(7)-ene-2,3,5,6-tetracarboxylic acid di-anhydride, 4,4'-bis(3,4-dicarboxyphenoxy)diphenyl sulfide di-anhydride, 5-(2,5-dioxo-tetra-hydrofuryl)-3-methyl-3-cyclohexene-1,2-dicarboxylic acid anhydride and tetrahydrofuran-2,3,4,5-tetracarboxylic acid di-anhydride. These fluorine-free tetracarboxylic acid di-anhydrides may be used alone or in any combination of at least two of them.

Examples of fluorine-containing diamines are 4-(1H,1H,11H-eicosafluoro-undecanoxy)-1,3-diaminobenzene, 4-(1H,1H-perfluoro-1-butanoxy)-1,3-diamino-benzene, 4-(1H,1H-perfluoro-1-heptanoxy)-1,3-diaminobenzene, 4-(1H,1H-perfluoro-1-octanoxy)-1,3-diaminobenzene, 4-pentafluorophenoxy-1,3-diaminobenzene, 4-(2,3,5,6-tetrafluorophenoxy)-1,3-diaminobenzene, 4-(4-fluorophenoxy)-1,3-diaminobenzene, 4-(1H,1H,2H,2H-perfluoro-1-hexanoxy)-1,3-diaminobenzene, 4-(1H,1H,2H,2H-perfluoro-1-dodecanoxy)-1,3-diaminobenzene, (2,5)-diamino-benzotrifluoride, bis(tri-fluoromethyl)phenylene-diamine, diamino-tetra(trifluoromethyl)benzene, diamino-(pentafluoroethyl)benzene, 2,5-diamino(perfluoro-hexyl)benzene, 2,5-diamino-(perfluoro-butyl)benzene, 1,4-bis(4-aminophenyl)benzene, p-bis(4-amino-2-trifluoro-methyl-phenoxy)benzene, bis(amino-phenoxy)bis(trifluoromethyl)benzene, bis(amino-phenoxy)tetrakis(trifluoromethyl)benzene, bis{2-[(amino-phenoxy)phenyl]hexafluoro-isopropyl} benzene, 2,2'-bis(trifluoromethyl)-4,4'-diamino-biphenyl, 3,3'-bis(trifluoro-methyl)-4,4'-diamino-biphenyl, octafluoro-benzidine, bis[(trifluoro-methyl)amino-phenoxy] biphenyl, 4,4'-bis(4-amino-2-trifluoromethyl-phenoxy) biphenyl, 4,4'-bis(4-amino-3-trifluoromethyl-phenoxy) biphenyl, 1,4-bis(anilino)octafluoro-butane, 1,5-bis(anilino) decafluoro-pentane, 1,7-bis(anilino)tetradecafluoro-heptane, 3,3'-difluoro-4,4'-diamino-diphenyl ether, 3,3',5,5'-tetrafluoro-4,4'-diamino-diphenyl ether, 2,2'-bis(tri-fluoromethyl)-4,4'-diamino-diphenyl ether, 3,3'-bis(trifluoromethyl)-4,4'-diamino-diphenyl ether, 3,3',5,5'-tetrakis(trifluoromethyl)-4,4'-diamino-diphenyl ether, 3,3'-difluoro-4,4'-diamino-diphenylmethane, 3,3'-di-(trifluoromethyl)-4,4'-diamino-diphenyl-methane, 3,3',5,5'-tetrafluoro-4,4'-diamino-diphenylmethane, 3,3',5,5'-tetrakis(trifluoro-methyl)-4,4'-diamino-diphenylmethane, 3,3'-difluoro-4,4'-diamino-diphenylpropane, 3,3',5,5'-tetrafluoro-4,4'-diamino-diphenylpropane, 3,3'-bis(trifluoromethyl)-4,4'-diamino-diphenylpropane, 3,3',5,5'-tetra(trifluoromethyl)-4,4'-diamino-diphenyl-propane, 3,3'-difluoro-4,4'-diamino-diphenyl-sulfone, 3,3',5,5'-tetrafluoro-4,4'-diamino-diphenyl-sulfone, 3,3'-bis(trifluoromethyl)-4,4'-diamino-diphenyl-sulfone, 3,3',5,5'-tetrakis(trifluoromethyl)-4,4'-diamino-diphenyl-sulfone, 4,4'-bis(4-amino-2-trifluoromethyl-phenoxy)diphenyl-sulfone, 4,4'-bis(3-amino-5-trifluoromethyl-phenoxy) diphenyl-sulfone, 3,3'-difluoro-4,4'-diamino-diphenyl sulfide, 3,3',5,5'-tetrafluoro-4,4'-diamino-diphenyl sulfide, 3,3'-bis(trifluoromethyl)-4,4'-diamino-diphenyl sulfide, 3,3',5,5'-tetrakis(trifluoromethyl)-4,4'-diamino-diphenyl sulfide, 3,3'-difluoro-4,4'-diamino-benzophenone, 3,3',5,5'-tetrafluoro-4,4'-diamino-benzophenone, 3,3'-bis(trifluoromethyl)-4,4'-diamino-benzophenone, 3,3',5,5'-tetra(trifluoromethyl)-4,4'-diamino-benzophenone, 3,3'-dimethyl-4,4'-diamino-diphenyl-hexafluoro-propane, 3,3'-dimethoxy-4,4'-diamino-di-phenyl-hexafluoro-propane, 3,3'-diethoxy-4,4'-diamino-diphenyl-hexafluoro-propane, 3,3'-difluoro-4,4'-diamino-diphenyl-hexafluoro-propane, 3,3'-dichloro-4,4'-diamino-di-phenyl-hexafluoro-propane, 3,3'-dibromo-4,4'-diamino-diphenyl-hexafluoro-propane, 3,3',5,5'-tetramethyl-4,4'-diamino-diphenyl-hexafluoro-propane, 3,3',5,5'-tetramethoxy-4,4'-diamino-diphenyl-hexafluoro-propane, 3,3',5,5'-tetraethoxy-4,4'-diamino-diphenyl-hexafluoro-propane, 3,3',5,5'-tetrafluoro-4,4'-diamino-diphenyl-hexafluoro-propane, 3,3',5,5'-tetrachloro-4,4'-diamino-diphenyl-hexafluoro-propane, 3,3',5,5'-tetrabromo-4,4'-diamino-diphenyl-hexafluoro-propane, 3,3',5,5'-tetrakis(trifluoromethyl)-4,4'-diamino-di-phenyl-hexafluoro-propane, 3,3'-bis(trifluoromethyl)-4,4'-diamino-diphenyl-hexafluoro-propane, 2,2-bis(4-aminophenyl) hexafluoro-propane, 1,3-bis(anilino)hexafluoro-propane, 2,2-bis[4-(4-aminophenoxy)phenyl]hexafluoro-propane, 2,2-bis[4-(3-amino-phenoxy)phenyl]hexafluoro-propane, 2,2-bis[4-(2-aminophenoxy)phenyl]hexafluoro-propane, 2,2-bis[4-(4-aminophenoxy)-3,5-dimethylphenyl] hexafluoro-propane, 2,2bis-[4-(4-aminophenoxy)-3,5-di-trifluoromethyl-phenyl]hexafluoro-propane, 2,2-bis[4-(4-amino-3-trifluoromethyl-phenoxy)phenyl]hexafluoro-propane, bis{[(trifluoromethyl)aminophenoxy]

phenyl}hexafluoro-propane, 1,3-diamino-5-(perfluoro-nonenyloxy)benzene, 1,3-diamino-4-methyl-5-(perfluoro-nonenyloxy)benzene, 1,3-diamino-4-methoxy-5-(perfluoro-nonenyloxy)benzene, 1,3-diamino-2,4,6-trifluoro-5-(perfluoro-nonenyloxy)benzene, 1,3-diamino-4-chloro-5-(perfluoro-nonenyloxy)benzene, 1,3-diamino-4-bromo-5-(perfluoro-nonenyloxy)benzene, 1,2-diamino-4-(perfluoro-nonenyloxy)benzene, 1,2-diamino-4-methyl-5-(perfluoro-nonenyloxy)benzene, 1,2-diamino-4-methoxy-5-(perfluoro-nonenyloxy)benzene, 1,2-diamino-3,4,6-trifluoro-5-(perfluoro-nonenyloxy)benzene, 1,2-diamino-4-chloro-5-(perfluoro-nonenyloxy)benzene, 1,2-diamino-4-bromo-5-(perfluoro-nonenyloxy)benzene, 1,4-diamino-3-(perfluoro-nonenyloxy)benzene, 1,4-diamino-2-methyl-5-(perfluoro-nonenyloxy)benzene, 1,4-diamino-2-methoxy-5-(perfluoro-nonenyloxy)benzene, 1,4-diamino-2,3,6-trifluoro-5-(perfluoro-nonenyloxy)benzene, 1,4-diamino-2-chloro-5-(perfluoro-nonenyloxy)benzene, 1,4-diamino-2-bromo-5-(perfluoro-nonenyloxy)benzene, 1,3-diamino-5-(perfluoro-hexenyloxy)benzene, 1,3-diamino-4-methyl-5-(perfluoro-hexenyloxy)benzene, 1,3-diamino-4-methoxy-5-(perfluoro-hexenyloxy)benzene, 1,3-diamino-2,4,6-trifluoro-5-(perfluoro-hexenyloxy)benzene, 1,3-diamino-4-chloro-5-(perfluoro-hexenyloxy)benzene, 1,3-diamino-4-bromo-5-(perfluoro-hexenyloxy)benzene, 1,2-diamino-4-(perfluoro-hexenyloxy)benzene, 1,2-diamino-4-methyl-5-(perfluoro-hexenyloxy)benzene, 1,2-diamino-4-methoxy-5-(perfluoro-hexenyloxy)benzene, 1,2-diamino-3,4,6-trifluoro-5-(perfluoro-hexenyloxy)benzene, 1,2-diamino-4-chloro-5-(perfluoro-hexenyloxy)benzene, 1,2-diamino-4-bromo-5-(perfluoro-hexenyloxy)benzene, 1,4-diamino-3-(perfluoro-hexenyloxy)benzene, 1,4-diamino-2-methyl-5-(perfluoro-hexenyloxy)benzene, 1,4-diamino-2-methoxy-5-(perfluoro-hexenyloxy)benzene, 1,4-diamino-2,3,6-trifluoro-5-(perfluoro-hexenyloxy)benzene, 1,4-diamino-2-chloro-5-(perfluoro-hexenyloxy)benzene and 1,4-diamino-2-bromo-5-(perfluoro-hexenyloxy)benzene. These fluorine-containing diamines may be used alone or as a mixture comprising at least two of them.

Examples of fluorine-free diamines include p-phenylene-diamine, m-phenylene-diamine, 2,6-diaminopyridine, 1,5-diaminonaphthalene, 2,6-diamino-naphthalene, benzidine, 3,3'-dimethyl-benzidine, 3,3'-dimethoxy-benzidine, 3,3'-diamino-benzophenone, 3,3'-dimethyl-4,4'-diamino-benzophenone, 3,3'-dimethoxy-4,4'-diamino-benzophenone, 3,3'-diethoxy-4,4'-diamino-benzophenone, 3,3'-dichloro-4,4'-diamino-benzophenone, 3,3'-dibromo-4,4'-diamino-benzophone, 3,3',5,5'-tetramethyl-4,4'-diamino-benzophenone, 3,3',5,5'-tetramethoxy-4,4'-diamino-benzophenone, 3,3',5,5'tetraethoxy-4,4'-diamino-benzophenone, 3,3',5,5'-tetrachloro-4,4'-diamino-benzophenone, 3,3',5,5'-tetrabromo-4,4-diamino-benzophenone, 4,4'-diamino-diphenyl ether, 3,4'-diamino-diphenyl ether, 3,3'-diamino-diphenyl ether, 3,3'-dimethyl-4,4'-diamino-diphenyl ether, 3,3'-di-isopropyl-4,4'-diamino-diphenyl ether, 3,3'-dimethoxy-4,4'-diamino-diphenyl ether, 3,3'-diethoxy-4,4'-diamino-diphenyl ether, 3,3'-dichloro-4,4'-diamino-diphenyl ether, 3,3'-dibromo-4,4'-diamino-diphenyl ether, 3,3',5,5'-tetramethyl-4,4'diamino-diphenyl ether, 3,3',5,5'-tetraethyl-4,4'-diamino-diphenyl ether, 3,3',5,5'-tetramethoxy-4,4'-diamino-diphenyl ether, 3,3',5,5'-tetraethoxy-4,4'-diamino-diphenyl ether, 3,3',5,5'-tetrachloro-4,4'-diamino-diphenyl ether, 3,3',5,5'-tetrabromo-4,4'-diamino-diphenyl ether, 3,3'-di-isopropyl-5,5'-dimethyl-4,4'-diamino-diphenyl ether, 3,3'-di-isopropyl-5,5'-diethyl-4,4'diamino-diphenyl ether, 4,4'-diamino-diphenyl-methane, 3,3'-diamino-diphenylmethane, 3,3'-dimethyl-4,4'-diamino-diphenylmethane, 3,3'-diethyl-4,4'-diamino-diphenylmethane, 3,3'-dimethoxy-4,4'-diamino-diphenyl-methane, 3,3'-diethoxy-4,4'-diamino-diphenylmethane, 3,3'-dichloro-4,4'-diamino-diphenylmethane, 3,3'-dibromo-4,4'-diamino-diphenylmethane, 3,3',5,5'-tetra-methyl-4,4'-diamino-diphenylmethane, 3,3',5,5'-tetra-isopropyl-4,4'-diamino-diphenylmethane, 3,3',5,5'-tetramethoxy-4,4'diamino-diphenylmethane, 3,3',5,5'-tetramethoxy-4,4'-diamino-diphenylmethane, 3,3',5,5'-tetrachloro-4,4'-diamino-diphenylmethane, 3,3',5,5'-tetrabromo-4,4'-diamino-diphenylmethane, 3,3',5,5'-tetra-isopropyl-4,4'-diamino-diphenyl-methane, 3,3'-di-isopropyl-5,5'-dimethyl-4,4'diamino-diphenylmethane, 3,3'-di-isopropyl-5,5'-diethyl-4,4'-diamino-diphenylmethane, 4,4'-diamino-diphenylpropane, 3,3'-diamino-diphenylpropane, 3,3'-dimethyl-4,4'-diamino-diphenylpropane, 3,3'-di-methoxy-4,4'-diamino-diphenylpropane, 3,3'-diethoxy-4,4'-diamino-diphenylpropane, 3,3'-dichloro-4,4'-diamino-diphenylpropane, 3,3'-dibromo-4,4'-diamino-diphenylpropane, 3,3',5,5'-tetramethyl-4,4'-diamino-diphenylpropane, 3,3',5,5'-tetramethoxy-4,4'-diamino-diphenylpropane, 3,3',5,5'-tetraethoxy-4,4'-diamino-diphenylpropane, 3,3',5,5'-tetrachloro-4,4'-diamino-diphenylpropane, 3,3',5,5'-tetrabromo-4,4'-diamino-diphenyl-propane, 3,3'-di-isopropyl-5,5'-dimethyl-4,4'-diamino-diphenylpropane, 3,3'-di-isopropyl-5,5'-diethyl-4,4'-diamino-diphenylpropane, 4,4'-diamino-diphenyl-sulfone, 3,3'-diamino-diphenyl-sulfone, 3,3'-dimethyl-4,4'-diaminodiphenyl-sulfone, 3,3'-dimethoxy-4,4'-diamino-diphenyl-sulfone, 3,3'-diethoxy-4,4'-diamino-diphenyl-sulfone, 3,3'-dichloro-4,4'-diamino-diphenyl-sulfone, 3,3'-dibromo-4,4'-diamino-diphenyl-sulfone, 3,3',5,5'-tetramethyl-4,4'-diamino-diphenyl-sulfone, 3,3',5,5'-tetramethoxy-4,4'-diamino-diphenyl-sulfone, 3,3',5,5'-tetraethoxy-4,4'-diamino-diphenyl-sulfone, 3,3',5,5'-tetrachloro-4,4'-diamino-diphenyl-sulfone, 3,3',5,5'-tetrabromo-4,4'-diamino-diphenyl-sulfone, 3,3'-di-isopropyl-5,5'-dimethyl-4,4'-diamino-diphenyl-sulfone, 3,3'-di-isopropyl-5,5'-diethyl-4,4'-diamino-diphenyl-sulfone, 4,4'-diamino-diphenyl sulfide, 3,3'-diamino-diphenyl sulfide, 3,3'-dimethyl-4,4'-diamino-diphenyl sulfide, 3,3'-dimethoxy-4,4'-diamino-diphenyl sulfide, 3,3'-diethoxy-4,4'-diamino-dipheny sulfide, 3,3'-dichloro-4,4'-diamino-diphenyl sulfide, 3,3'-dibromo-4,4'-diamino-diphenyl sulfide, 3,3',5,5'-tetramethyl-4,4'-diamino-diphenyl sulfide, 3,3',5,5'-tetramethoxy-4,4'-diamino-diphenyl sulfide, 3,3',5,5'-tetra-ethoxy-4,4'-diamino-diphenyl sulfide, 3,3',5,5'-tetrachloro-4,4'-diamino-diphenyl sulfide, 3,3',5,5'-tetrabromo-4,4'-diamino-diphenyl sulfide, 1,4-bis-(4-aminophenoxy)benzene, 1,3-bis-(4-aminophenoxy)benzene, 2,2-bis-(4-aminophenoxy-phenyl)propane, bis-(4-amino-phenoxy-phenyl)sulfone, bis-(4-aminophenoxy-phenyl)sulfide, bis-(4-amino-phenoxy-phenyl)biphenyl, 4,4'-diaminodiphenyl ether-3-sulfonamide, 3,4'-diamino-diphenyl ether-4-sulfonamide, 3,4'-diamino-diphenyl ether-3'-sulfonamide, 3,3'-diamino-diphenyl ether-4-sulfonamide, 4,4'-diamino-diphenylmethane-3-sulfonamide, 3,4'-diamino-diphenylmethane-4-sulfonamide, 3,4'-diamino-diphenylmethane-3'-sulfon-amide, 3,3'-diamino-diphenylmethane-4-sulfonamide, 4,4'-diamino-diphenylsulfone-3-sulfonamide, 3,4'-diamino-diphenylsulfone-4-sulfonamide, 3,4'-diamino-diphenyl-sulfone-3'-sulfonamide, 3,3'-diamino-diphenylsulfone-4-sulfonamide, 4,4'-diamino-diphenylsulfide-3-sulfonamide, 3,4'-diamino-diphenylsulfide-4-sulfonamide, 3,3'-diaminodiphenylsulfide-4-sulfonamide, 3,4'-diamino-diphenylsulfide-3'-sulfonamide, 1,4-diaminobenzene-2-sulfonamide, 4,4'-diamino-diphenyl ether-3-carbonamide, 3,4'-diamino-diphenyl ether-4-carbonamide, 3,4'-diamino-diphenyl ether-3'-carbonamide, 3,3'-diamino-diphenyl ether-4-carbonamide, 4,4'-diamino-diphenylmethane-3-carbonamide, 3,4'-diamino-diphenylmethane-4-carbonamide, 3,4'-diamino-diphenylmethane-3'-carbonamide, 3,3'-diamino-diphenylmethane-4-carbonamide, 4,4'-diamino-diphenyl-sulfone-3-carbonamide, 3,4'-diamino-diphenyl-sulfone-4-carbonamide, 3,4'-diamino-di-phenyl-sulfone-3'-carbonamide, 3,3'-diamino-diphenyl-sulfone-4-carbonamide, 4,4'-diamino-diphenyl sulfide-3-carbonamide, 3,4'-diamino-diphenyl sulfide-4-carbonamide, 3,3'-diamino-diphenyl sulfide-4-carbonamide, 3,4'-diamino-diphenyl sulfide-3'-carbon-amide, 1,4-diamino-benzene-2-carbonamide, 4-aminophenyl-3-amino-benzoic acid, 2,2-bis (4-aminophenyl)propane, bis-(4-aminophenyl)diethyl-silane, bis-(4-amino-phenyl)diphenyl-silane, bis-(4-aminophenyl)ethyl-phosphine oxide, bis-(4-amino-phenyl)-N-butylamine, bis-(4-aminophenyl)-N-methylamine, N-(3-aminophenyl)-4-amino-benzamide, 2,4-bis-(β-amino-t-butyl)toluene, bis-(p-β-amino-t-butyl-phenyl)ether, bis-(p-β-methyl-γ-amino-pentyl)benzene, bis-p-(1,1-dimethyl-5-aminopentyl)benzene, hexamethylene-diamine, heptamethylene-diamine, octamethylene-diamine, nanomethylene-diamine, decamethylene-diamine, tetramethylene-diamine, propylene-diamine, 3-methyl-heptamethylene-diamine, 4,4'-dimethyl-heptamethylene-diamine, 2,11-diamino-dodecane, 1,2-bis-(3-aminopropoxy) ethane, 2,2-dimethyl-propylene-diamine, 3-methoxy-hexamethylene-diamine, 2,5-dimethyl-hexamethylene-diamine, 2,5-dimethyl-heptamethylene-diamine, 5-methyl-nonamethylene-diamine, 2,17-diamino-eicosa-decane, 1,4-diamino-cyclohexane, 1,10-diamino-1,10-dimethyldecane and 1,12-diamino-octadecane. These fluorine-free diamines may be used alone or a mixture of at least two of them.

A silicone-diamine may be used as a part of the foregoing diamine. Examples of such silicone-diamines are 1,3-bis-(3-aminopropyl)-1,1,1-tetraphenyl-disiloxane, 1,3-bis-(3-aminopropyl)-1,1,1-tetramethyl-disiloxane and 1,3-bis-(4-aminobutyl)-1,1,1-tetra-methyl-disiloxane. When using such silicone-diamines, they are preferably used in an amount ranging from 0.1 to 10 mole % on the basis of the total amount of the diamine used. Each of the foregoing tetracarboxylic acid di-anhydride and diamine may be used in combination of at least two thereof As the solution of a precursor used for preparing a polyimide resin, one having light-sensitivity can be used as well.

Such a solution of a polyimide precursor is applied onto the surface of a substrate according to a method, which makes use of, for instance, a spinner or a printing method and the resulting layer of the solution is then heat-treated at a final temperature ranging from 200 to 400° C. to cure the same and to thus form a fluorine-containing polyimide resin film. The thickness of the resulting fluorine-containing polyimide resin film is controlled to a desired level by changing or adjusting, for instance, the concentration and viscosity of the polyimide precursor solution and the rotational frequency of the spinner used. The fluorine-containing polyimide resin film may, if necessary, be processed into an optical waveguide by any known method, for instance, the etching technique or the irradiation of the film with electromagnetic waves including light rays or a corpuscular beam including an electron beam. In the formation of an optical waveguide, the resulting optical waveguide may be one constituted by a fluorine-containing polyimide resin film, which comprises a plurality of films having different refractive indices, prepared according to a known method.

The fluorine-free polyimide resin film is formed by applying a solution containing the precursor for the fluorine-free polyimide resin onto the surface of a substrate according to a method, which makes use of a spinner or a printing means and then heat-treating the coated layer at a final temperature ranging from 200 to 400° C. to thus cure the layer. The thickness of the resulting fluorine-free polyimide resin film is controlled to a desired level by adjusting, for instance, the concentration and viscosity of the polyimide precursor solution and the rotational frequency of the spinner used.

The thickness of the fluorine-free polyimide resin film is preferably not less than 0.1 $\mu$m and not more than 10 $\mu$m. If the thickness thereof exceeds 10 $\mu$m, the total thickness of the fluorine-containing polyimide resin film and the fluorine-free polyimide resin film is too thick and the film is liable to cause warpage by the action of the stress generated due to the difference in the expansion coefficient between the layer and the substrate. In addition, it is also difficult to obtain a resin film having a uniform overall thickness. On the other hand, it is quite difficult to form a resin film having a thickness of less than 0.1 $\mu$m because of the low film-forming ability and the difficulty in forming a uniform resin film from the precursor solution.

Moreover, the foregoing substrate may be a silicon wafer and a silicon oxide layer or film may be formed on the silicon wafer. A silicon oxide layer is formed on the surface of a silicon wafer and it is thus possible to provide an optical waveguide device comprising an optical waveguide formed from a polyimide resin and electrodes arranged on the optical waveguide.

In the structure comprising a substrate and electrodes formed on the substrate according to the present invention, it is preferred that the surface layer of the foregoing electrode is made of gold and an aluminum layer is interposed between the substrate and the gold layer.

Moreover, in the foregoing electrode structure, it is preferred to interpose a layer of a high melting point material between the foregoing gold and aluminum layers and, in this respect, the term "high melting point material" herein used means a material having a melting point of not less than 1000° C.

As the foregoing high melting point material, preferably used herein are those comprising at least one high melting point metal selected from the group consisting of chromium (Cr), titanium (Ti), molybdenum (Mo) and tungsten (W).

In addition to the foregoing high melting point metals, the foregoing high melting point materials preferably used herein also include those comprising at least one ceramic selected from the group consisting of silicon monoxide (SiO), silicon dioxide ($SiO_2$), titanium monoxide (TiO), titanium dioxide ($TiO_2$), di-titanium trioxide (titanium sesquioxide: $Ti_2O_3$), silicon carbide (SiC), silicon nitride ($Si_3N_4$), chromium oxide ($Cr_2O_3$) and di-tantalum pentaoxide ($Ta_2O_5$).

The thicknesses of the layers preferably ranges from about 0.2 $\mu$m to 2 $\mu$m for the Al layer, about 0.02 $\mu$m to 0.4 $\mu$m for the layer of the high melting point material and about 0.1 $\mu$m to 2 $\mu$m for the Au layer. Moreover, the layer of the high melting point material may comprise a mixture of at least two high melting point metals and/or the layer may have a multi-layer structure comprising at least two layers. Ceramic materials such as SiO, $SiO_2$, TiO, $TiO_2$, $Ti_2O_3$, SiC, $Si_3N_4$, $Cr_2O_3$, $Ta_2O_5$ may likewise be used in the form of a mixture comprising at least two ceramic materials and/or the layer thereof may have a multi-layer structure comprising at least two layers, like the foregoing high melting point metals. Alternatively, a mixture of a high melting point metal and a ceramic material may be used.

The electrode may be formed using a variety of methods. As such methods, there may be listed, for instance, vacuum vapor deposition techniques and coating techniques. In this respect, specific examples of vacuum vapor deposition techniques are electron beam evaporation methods, sputtering methods and resistance heating methods. Moreover, the thickness preferably ranges from about 0.02 $\mu$m to 0.4 $\mu$m for a Cr layer or about 0.1 $\mu$m to 2 $\mu$m for an Au layer. In this connection, it is also possible to use a high melting point metal selected from the group consisting of Cr, Ti, Mo, W and mixture thereof and a plurality of high melting point metal layers may be formed.

In addition, the foregoing substrate may be a silicon wafer and a silicon oxide layer or film may be formed on the silicon wafer. Alternatively, the substrate may have a laminated structure comprising the foregoing silicon wafer and a polyimide layer. When the overall thickness of the electrode is thicker than 4 $\mu$m, the stress generated in the film increases and the electrode layer may easily be peeled off from the substrate. Accordingly, the overall thickness of the electrode layer including the foregoing gold layer and the foregoing aluminum layer is preferably not more than 4 $\mu$m. Thus, an electrode structure excellent in the connection strength can be provided if such an electrode structure is formed on an optical waveguide device.

EXAMPLES

Examples of the present invention will hereunder be described with an optical waveguide device taken as an example. An optical waveguide device 100 is formed on a substrate. In this respect, a silicon substrate, a silicon substrate whose surface is covered with a silicon dioxide layer and a glass substrate may be used as such a substrate. In this example, a silicon substrate 1 is provided thereon with a laminate body 10 of an optical waveguide.

Example 1

Figure 2:
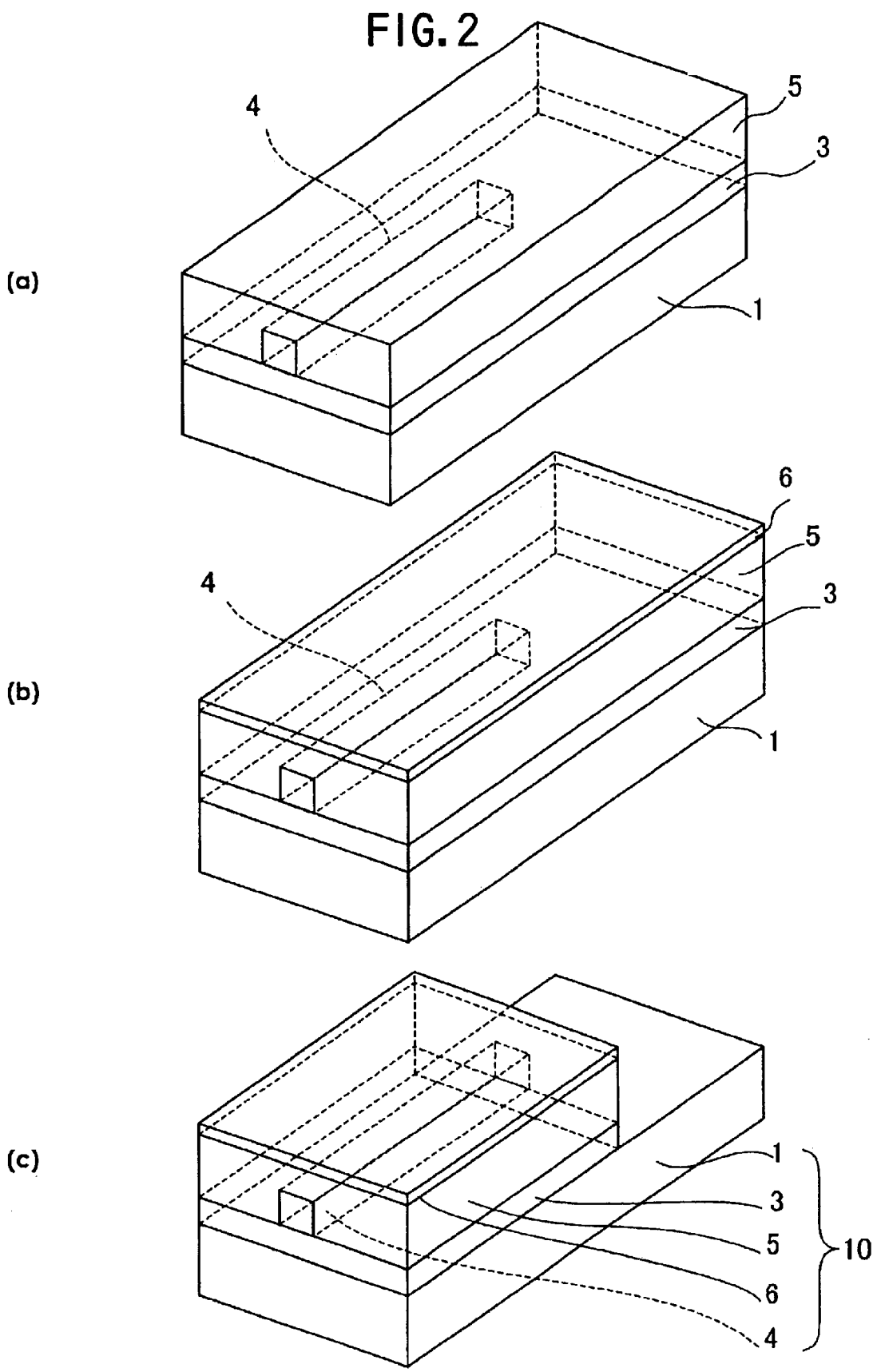
FIGS. 2(a)–2(c) constitute a flow diagram showing partially broken perspective views for illustrating a method for the production of a schematic optical waveguide device according to another embodiment of the present invention.
Figure 3:
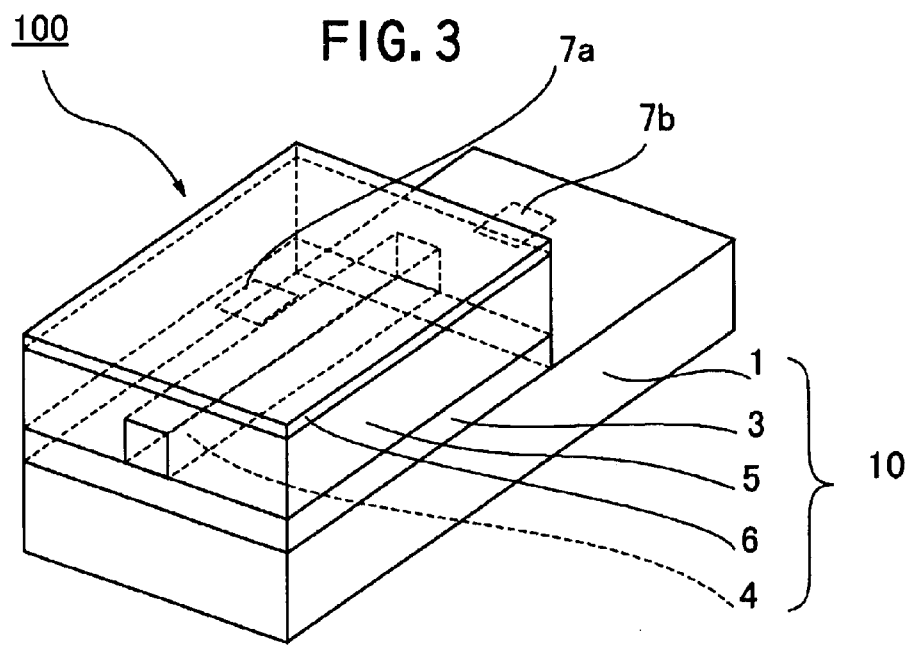
FIG. 3 is a perspective view illustrating an embodiment of the structure of a schematic optical waveguide device.

The method for the production of an optical waveguide device according to the present invention will be described below. In this Example, a silicon wafer having a diameter of 76 mm was used as the substrate 1, a plurality of structural units each having a structure as shown in FIG. 3 were arranged on the substrate 1 and then the substrate was cut into every structural units by dicing to thus give a large number of optical waveguide devices 100 as shown in FIG. 3 at a time. In this Example, each of operations such as a film-forming operation and a patterning operation was carried out, at a time, for each wafer-like substrate 1 in its entirety. Each of FIGS. 1(*a*) to 1(*c*) and FIGS. 2(*d*) to 2(*f*) shows only a structural unit serving as an optical waveguide device 100 cut out from the wafer-like substrate 1 to meet the convenience of illustration.

(1) Step for Forming Lower Clad Layer

A film of a solution containing the material therefor was formed by spin-coating OPI-N1005 (Trade Name of a fluorine-containing polyimide resin available from Hitachi Chemical Co., Ltd.) on the upper face of the substrate 1. Thereafter, the substrate carrying the coated layer was heated, in a dryer, to 100° C. for 30 minutes and then at 200° C. for 30 minutes to thus remove the solvent through evaporation and subsequently it was further heated at 370° C. for 60 minutes to cure the resin and to thus form a lower clad layer 3 having a thickness of 6 $\mu$m (FIG. 1(*b*)).

(2) Step for Forming Optical Waveguide

A layer of a solution containing the material therefor was formed by spin-coating OPI-N3205 (Trade Name of a fluorine-containing polyimide resin available from Hitachi Chemical Co., Ltd.) on the surface of the lower clad layer 3. Thereafter, the substrate carrying the coated layer was heated, in a dryer, at 100° C. for 30 minutes and then at 200° C. for 30 minutes to thus remove the solvent through evaporation and subsequently it was further heated at 350° C. for 60 minutes to cure the resin and to thus form a polyimide film having a thickness of 6 $\mu$m and capable of serving as an optical waveguide 4.

The resulting polyimide film was then patterned into a desired shape of the optical waveguide 4 by the photolithography technique. More specifically, a resist was spin-coated on the polyimide layer capable of serving as an optical waveguide 4, followed by drying the coated layer at 100° C., the irradiation of the resist with light rays from a mercury lamp through a mask image and then the development of the exposed resist layer to thus form a resist pattern. This resist pattern layer was used as a mask for patterning the foregoing polyimide resin layer into the shape of the optical waveguide 4 and the polyimide resin layer was subjected to a reactive ion etching treatment using oxygen gas ($O_2$-RIE) to thus form a plurality of optical waveguides 4 on the substrate 1 in arrangement (FIG. 1(*c*)). Thereafter, the resist pattern layer was peeled off.

(3) Step for the Production of Upper Clad Layer

Then OPI-N1005 (Trade Name of a fluorine-containing polyimide resin available from Hitachi Chemical Co., Ltd.) was spin-coated in such a manner that it covered the optical waveguide 4 and the lower clad layer 3. The resulting layer of the solution containing the material therefor was heated, in a dryer, at 100° C. for 30 minutes and then at 200° C. for 30 minutes to thus remove the solvent through evaporation and subsequently it was further heated at 350° C. for 60 minutes to thus form an upper clad layer 5 of the polyimide film (FIG. 2(*d*)).

(4) Formation of Adhesive Layer

Next, PIQ13 (Trade Name of a fluorine-free polyimide resin available from Hitachi Chemical Co., Ltd.) was spin-coated in such a manner that it covered the upper clad layer 5. The resulting layer of the solution containing the material for an adhesive layer was heated, in a dryer, at 100° C. for 30 minutes and then at 200° C. for 30 minutes to thus remove the solvent from the solution through evaporation and subsequently it was further heated at 350° C. for 60 minutes to thus form an adhesive layer 6 of fluorine-free polyimide film and having a thickness of 1 $\mu$m (FIG. 2(*e*)).

(5) Step for Forming Electrodes

Then the adhesive layer 6 and the layers extending from the upper clad layer 5 to the lower clad layer 3 present on the regions of the silicon substrate on which electrodes would be formed later were removed, from the substrate 1, through peeling after making cuts in the laminate film comprising the adhesive layer 6, the upper clad layer 5, the optical waveguide 4 and the lower clad layer 3 in the direction of the lamination through dicing. As a result, the optical waveguide laminate 10 had a shape as shown in FIG. 2(*f*) and the silicon substrate 1 was exposed in the regions on the substrate 1 corresponding to the electrode-forming regions 7.

(6) Formation of Resist Layer 62

Figure 4:
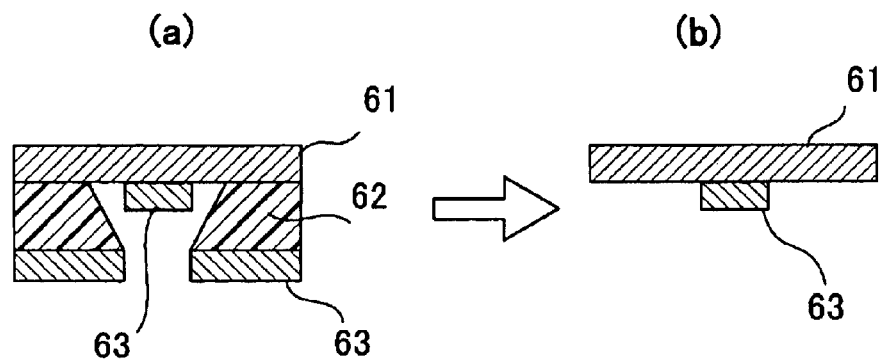
FIGS. 4(a) and 4(b) constitute a diagram for explaining the film-forming processes in the production of an electrode.

Subsequently, a resist layer 62 was formed on the surface of the adhesive layer 6 and the surface of the silicon substrate 1 of the substrate 61 (a silicon substrate 1 provided with a lower clad layer 3, an optical waveguide 4, an upper clad layer 5 and an adhesive layer 6 formed thereon) using a positive novolak phenol resin as shown in FIG. 4(a) and then the resist layer was patterned into a desired shape according to the photolithography technique.

(7) Formation of Laminate Film 63

A Cr layer was formed on the assembly obtained in the step (6) to a thickness of 0.05 μm by the vacuum vapor deposition technique and then an Au layer having a thickness of 0.5 μm was likewise formed thereon to thus give a laminate film 63.

(8) Peeling Off of Resist Layer 62

Figure 5:
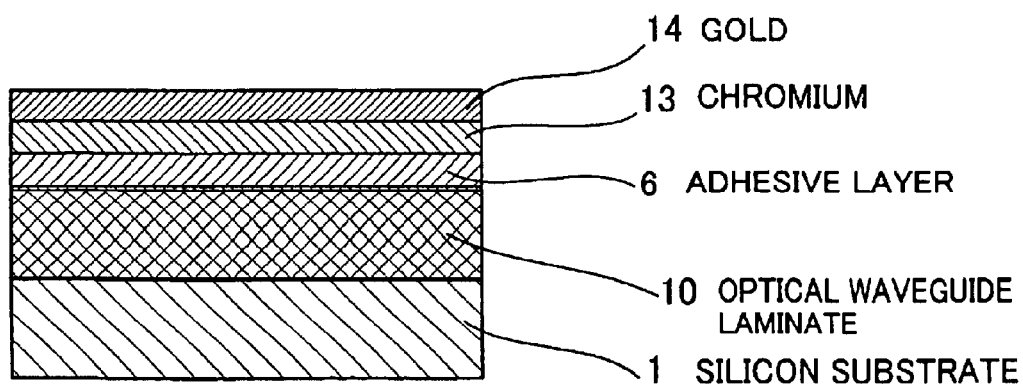
FIG. 5 is a cross sectional view showing a schematic electrode according to an embodiment.
Figure 6:
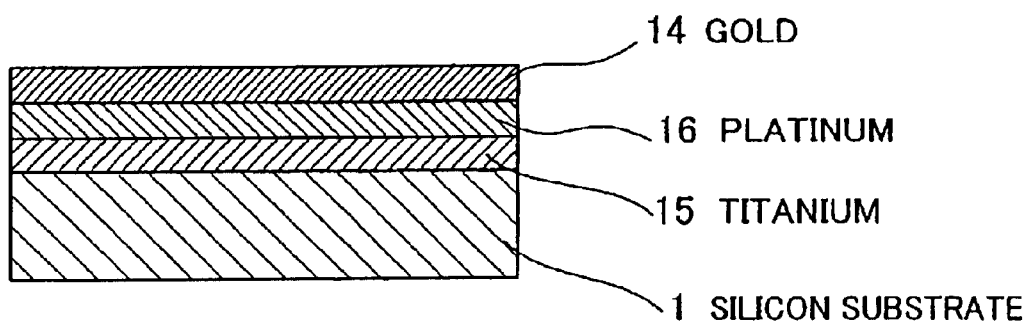
FIG. 6 is a cross sectional view for explaining a conventional technique.
Figure 7:
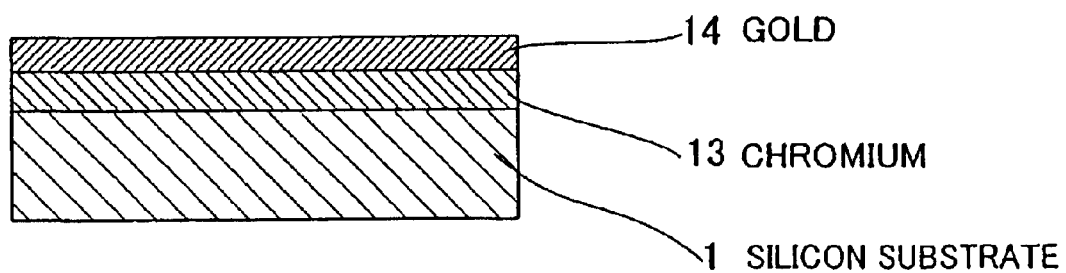
FIG. 7 is a cross sectional view for explaining another conventional technique.

Subsequently, the resist layer 62 was peeled off to give a substrate 61 (FIGS. 4(b) and 5) provided with electrodes 7 (7a and 7b of FIG. 3) consisting of the laminate film 63 (FIG. 4(b)) formed on the substrate.

In the foregoing Example, the unnecessary metal layer was removed from the assembly according to the lift off method in which a resist layer was formed in advance, electrodes were then formed on the resist layer and then the resist layer was peeled off to thus form electrodes on the open areas of the resist layer. However, electrodes may likewise be formed by forming a layer of an electrode material on the whole surface of the substrate, forming a resist layer and then removing the unnecessary area of the electrode layer according to the ion milling method or the reactive dry etching method.

(9) Cutting Step

Thereafter, the assembly obtained in the foregoing step was cut into wafer-like substrates 1 having a shape as shown in FIG. 3 by dicing to thus complete optical waveguide devices 100.

Thus, an optical waveguide device having electrodes can be produced. Au wires were then adhered to the portions for connection (electrodes 7a and 7b) by the ultrasonic welding. As a result, the Au wires were well adhered to the both electrodes 7a and 7b and the bonding strength thereof was found to be not less than 5 g and it was also found that the connection was broken at the ball neck portion. In addition, the shear strength was found to be 50 to 60

Comparative Example 1

The same procedures used in Example 1 were repeated except that the step (4) (Formation of Adhesive Layer) used in Example 1 was omitted to form an optical waveguide device 100. In this case, it was found that when a laminate film 63 (electrodes) was formed and then the resist layer 62 was peeled off, the laminate film 63 (electrode 7a) was peeled off.

Example 2

The same procedures used in Example 1 were repeated except that a Cr film was formed on the adhesive layer 6 for the fluorine-free polyimide resin serving as a substrate to a thickness of 0.05 μm by the vacuum vapor deposition method, an Al film was formed on the Cr film to a thickness of 1.5 μm by the vacuum vapor deposition method, Cr as a high melting point material was deposited on the Al film to a thickness of 0.1 μm and further an Au film having a thickness of 0.5 μm to thus form a laminate film 63, to thus produce an optical waveguide device 100.

Au wires were connected, through the ultrasonic welding, to the connection portions (electrodes 7a and 7b) of the optical waveguide device having the electrode structure produced by the foregoing method. As a result, the Au wires were well connected to the both electrodes 7a and 7b, the bonding strength thereof was found to be not less than 5 g and it was also found that the connection was broken at the ball neck portion. In addition, the shear strength was found to be good on the order of 70 to 100 g.

The results obtained in Examples 1 and 2 clearly indicate that when using a substrate on which a fluorine-containing polyimide layer is formed and an adhesive layer 6 of a fluorine-free resin is further formed on the fluorine-containing polyimide layer, the resulting optical waveguide device having an electrode structure is quite excellent since the device never causes any peeling off of the electrode, the bonding strength of Au wires is not less than 5 g and the electrodes never undergo any peeling off due to the insufficient adhesion thereof to the substrate.

The aluminum layer existing on the substrate can relieve the energy of the ultrasonic wave applied to the optical waveguide device upon the wire bonding operation and good connection strength is thus maintained at the boundary between the substrate and the electrodes.

INDUSTRIAL APPLICABILITY

In the electrode structure of the present invention, the electrodes are formed on a substrate of a fluorinated polyimide resin through a layer of a fluorine-free resin and therefore, the structure never causes any peeling off of electrodes and can ensure sufficient connection strength. The electrode structure of the present invention is preferably applied when electrodes are formed on the optical waveguide of an optical waveguide substrate comprising a fluorinated polyimide resin through a layer of a fluorine-free resin.

What is claimed is:

1. An electrode structure, which comprises a substrate provided with an electrode formed thereon, wherein the substrate comprises a layer of a fluorine-containing polyimide and a layer of a fluorine-free resin is interposed between the polyimide layer and the electrode.

2. The electrode structure as set forth in claim 1, wherein the fluorine-free resin is fluorine-free polyimide.

3. The electrode structure as set forth in claim 1 or 2, wherein the substrate is a silicon wafer on which a fluorine-containing polyimide resin layer and a fluorine-free resin layer are laminated in this order.

4. The electrode structure as set forth in claim 1 or 2, wherein the substrate is a silicon wafer on which a silicon oxide film, a fluorine-containing polyimide resin layer and a fluorine-free resin layer are laminated in this order.

5. The electrode structure as set forth in claim 1 or 2, wherein the substrate is an optical waveguide substrate.

6. The electrode structure as set forth in claim 1 or 2, wherein the electrode comprises a gold layer as the outermost or surface layer and an aluminum layer interposed between the substrate and gold layer.

7. The electrode structure as set forth in claim 6, wherein the electrode comprises a gold layer as the outermost or surface layer, an aluminum layer interposed between the substrate and the gold layer and further a layer of a high melting point material arranged between the gold and aluminum layers.

8. The electrode structure as set forth in claim 7, wherein the high melting point material comprises a member selected from the group consisting of chromium, titanium, molybdenum, tungsten and mixtures each containing at least two of these members.

9. The electrode structure as set forth in claim 7, wherein the high melting point material is a ceramic.

10. The electrode structure as set forth in claim 7, wherein the high melting point material comprises a member selected from the group consisting of silicon monoxide, silicon dioxide, titanium monoxide, titanium dioxide, titanium sesquioxide, silicon carbide, silicon nitride, chromium oxide, tantalum pentaoxide and mixtures each containing at least two of these members.

11. The electrode structure as set forth in claim 6, wherein the overall thickness of the electrode including the gold and aluminum layers is not more than 4 $\mu$m.

* * * * *